(No Model.)
H. WILSON.
COMBINED WAGON BED LIFTER AND WIRE STRETCHER.
No. 445,437. Patented Jan. 27, 1891.
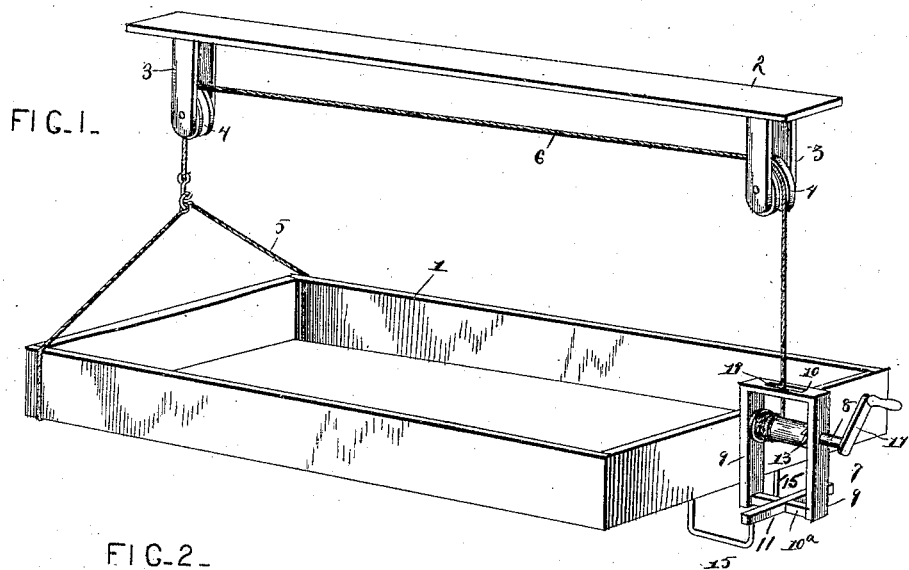
FIG. 1.
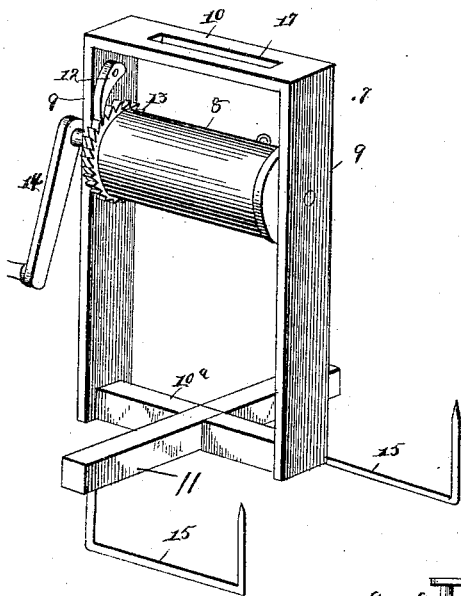
FIG. 2.
FIG. 3.
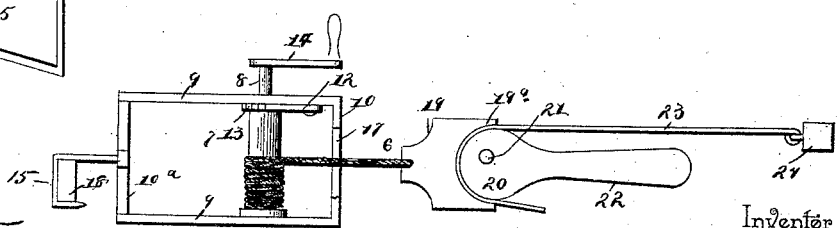
Witnesses
Geo. E. Frech
H. F. Riley
Inventor
Hardin Wilson
By his Attorneys,
C. A. Snow & Co.

UNITED STATES PATENT OFFICE.

HARDIN WILSON, OF BUCHANAN, TENNESSEE.

COMBINED WAGON-BED LIFTER AND WIRE-STRETCHER.

SPECIFICATION forming part of Letters Patent No. 445,437, dated January 27, 1891.

Application filed October 9, 1890. Serial No. 367,540. (No model.)

*To all whom it may concern:*

Be it known that I, HARDIN WILSON, a citizen of the United States, residing at Buchanan, in the county of Henry and State of Tennessee, have invented a new and useful Combined Wagon-Bed Lifter and Wire-Stretcher, of which the following is a specification.

My invention relates to a wagon-bed hoist or lifter, and particularly to the windlass-frame, which may also be adapted for use as a wire-stretcher; and it consists in certain features of novelty to be hereinafter described, and then pointed out in the claims.

In the accompanying drawings, Figure 1 is a perspective view showing a wagon-bed hoist. Fig. 2 is a perspective view of the windlass-frame or tension device. Fig. 3 is a side view showing the windlass-frame when used as a tension device or wire-stretcher.

1 represents the wagon-bed; 2, a fixed beam or timber provided at each end with bearings 3 for the pulleys 4. Connected with one end of the wagon-body 1, which is to be hoisted, is a loop 5, to which is connected one end of a rope 6, which passes over the pulleys 4, the other end of the rope being wound upon the drum or windlass 7.

The drum or windlass 7 is provided with a shaft 8, that is journaled in the sidebars 9, that at each end are connected by end bars 10 10$^a$, across which latter bar extends a cross-bar 11, all of said bars constituting the windlass-frame. Pivoted at the inner side of one of the side bars 9 is a pawl 12, that engages the circular series of ratchet-teeth 13 at one end of the drum or windlass 7, thereby preventing retrograde movement of the drum. On one end of the shaft 8, outside of the windlass-frame, is removably fitted a crank 14 for turning the drum. Projecting from the bottom of the cross-bar 11 of the windlass-frame, at each end thereof, is a U-shaped hook 15, said hooks being parallel with each other and with the drum or windlass 7. When used as a wagon-bed hoist, the crank of the drum or windlass 7 being turned in the proper direction will cause the rope 6 to wind thereupon, and thus elevate the wagon bed or body 1. It is apparent from Fig. 1 that the ends of the pair of hooks 15 engage the end of the body 1 opposite the loop 5.

The advantages of the pair of hooks of the windlass-frame over all others are that they prevent the bed from turning about while being hoisted, and the rope passing through the slot 17, extending longitudinally of the end bar 10, also helps to hold the bed in proper position and keeps it from turning about.

Another decided advantage in my windlass-frame or tension device is that it is adapted for wire-stretching in the building of fences or other analogous uses.

When used as a wire-stretcher, (see Fig. 3,) the windlass-frame will be in a horizontal position, with its pair of hooks 15 engaging a post 18, and the outer end of the rope 6 will have secured thereto a block 19. The block 19 will be provided at one side with a recess or a concavity 19$^a$, which is opened at the end of the block, so as to admit of a cam 20 being pivoted at 21 in a plane parallel with the bottom of the recess, said cam being provided with an operating-lever 22. The wire 23 to be stretched runs from a post 24 and is clamped between the cam and the circular side of the recess in block 19, thus constituting a clamp. This clamp forms no part of my present invention, as of course any other suitable clamp attached to the rope 6 may be provided.

Whether the windlass-frame or tension device be used as a hoist for wagon-beds or as a wire-stretcher, its operation is always the same, the pair of hooks carried thereby in either case engaging the wagon-bed or a post.

The frame of the windlass or tension device is preferably made of malleable iron in one piece.

What I claim is—

1. The herein-described windlass-frame, the same comprising a windlass at one end, a cross-bar at the other end, and a hook projecting from each end of said cross-bar, substantially as and for the purpose set forth.

2. In the herein-described windlass-frame or tension device, the combination of end bars 10 10$^a$, side bars 9, cross-bar 11, extending across bar 10ª, a hook at each end of cross-bar 11, and a windlass provided with a shaft journaled in the side bars 9, the end bar 10 being provided with a slot or opening, all substantially as and for the purpose set forth.

In testimony that I claim the foregoing as my own I have hereto affixed my signature in presence of two witnesses.

HARDIN WILSON.

Witnesses:
I. W. HUDSON,
T. W. LOVE.